Nov. 11, 1952

H. GANG 2,617,590

MULTIPLICATION CONTROL MECHANISM
FOR CALCULATING MACHINES

Filed May 5, 1950

INVENTOR
HERMAN GANG
BY George V. Hall
ATTORNEY

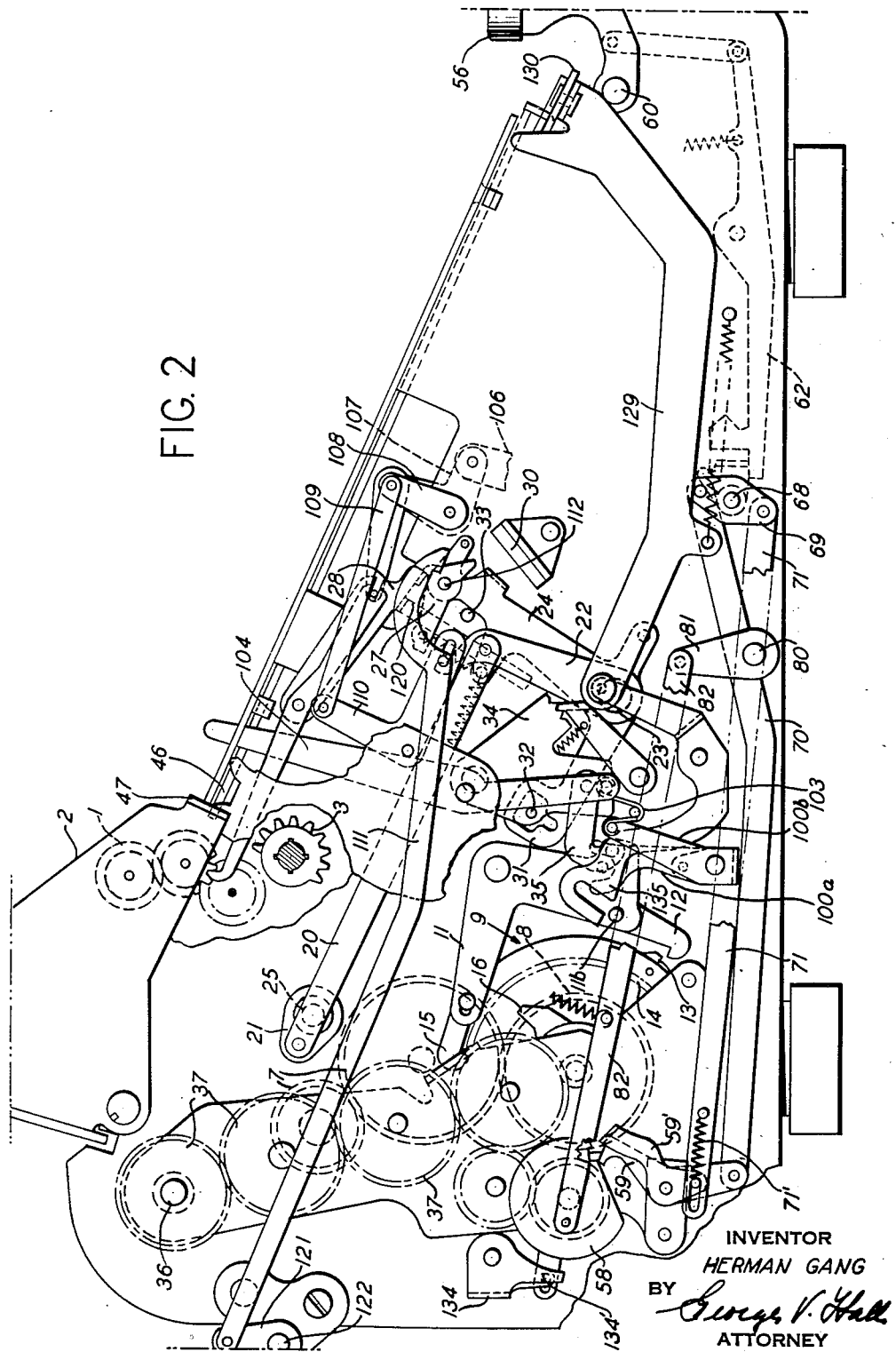

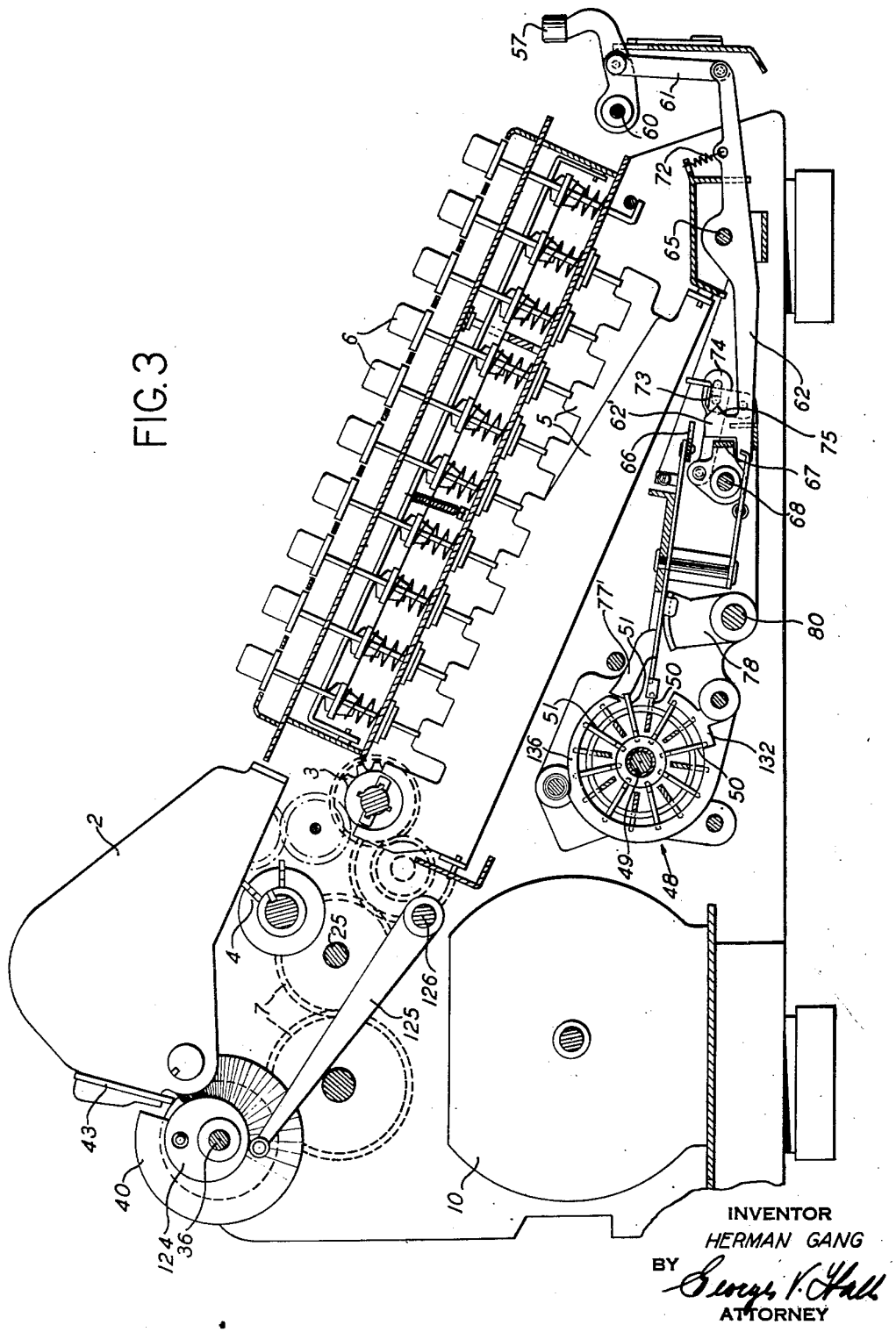

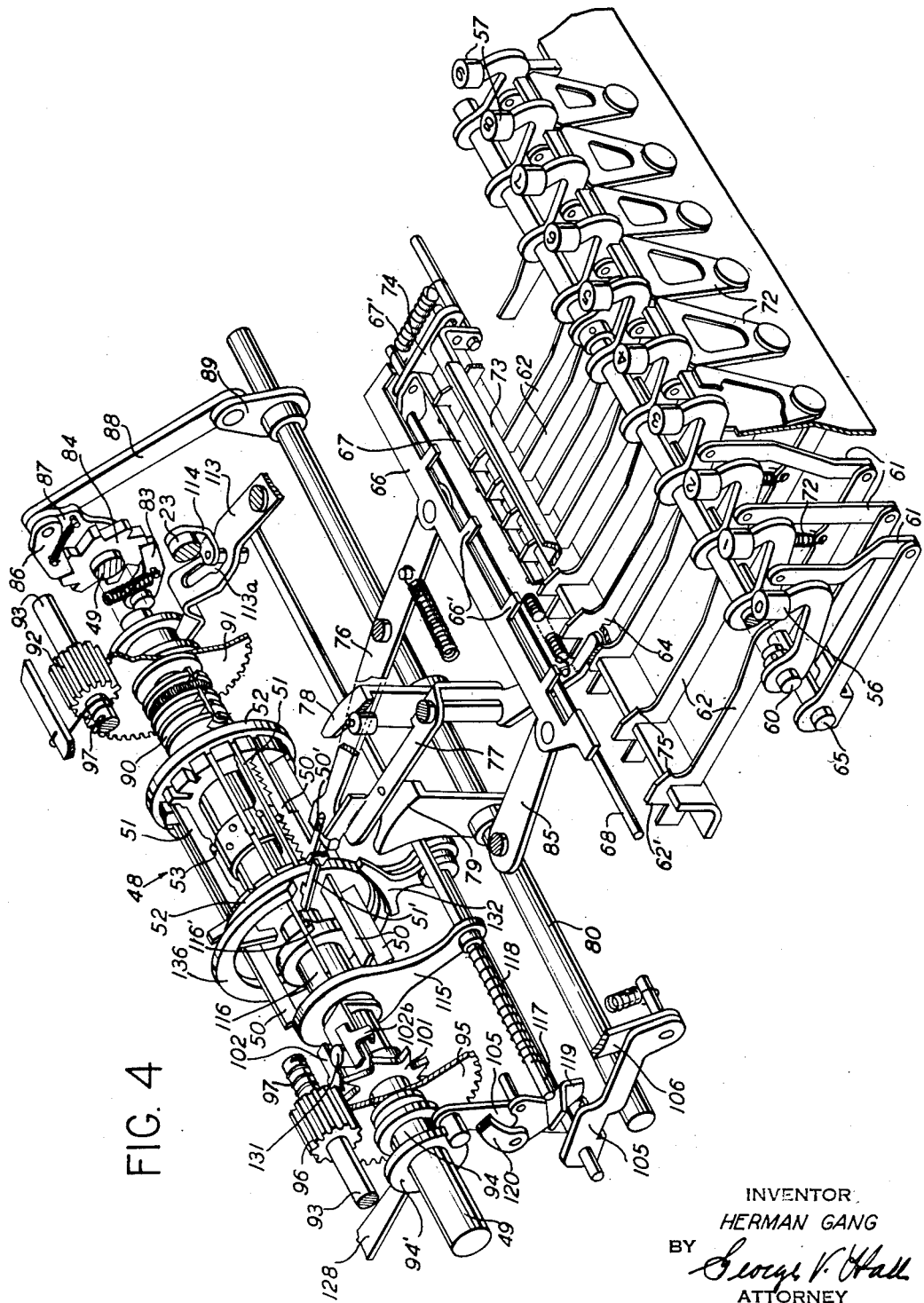

Nov. 11, 1952   H. GANG   2,617,590
MULTIPLICATION CONTROL MECHANISM
FOR CALCULATING MACHINES
Filed May 5, 1950   7 Sheets-Sheet 5

INVENTOR
HERMAN GANG
BY George V. Hall
ATTORNEY

INVENTOR
HERMAN GANG

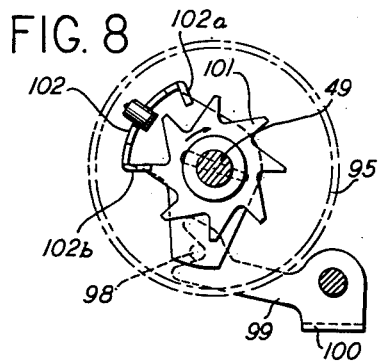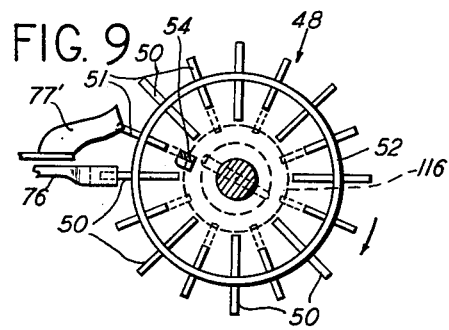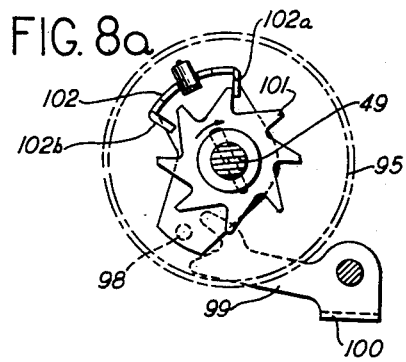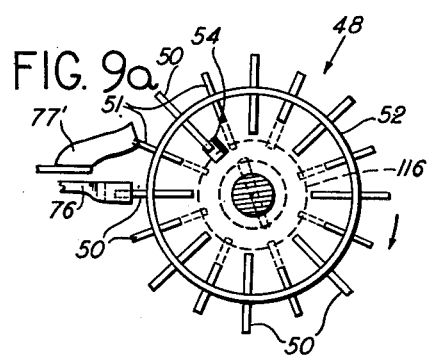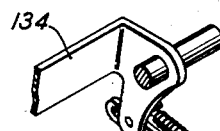

Patented Nov. 11, 1952

2,617,590

UNITED STATES PATENT OFFICE 2,617,590

MULTIPLICATION CONTROL MECHANISM FOR CALCULATING MACHINES

Herman Gang, Livingston, N. J., assignor to Monroe Calculating Machine Company, Orange, N. J., a corporation of Delaware Application May 5, 1950, Serial No. 160,154

23 Claims. (Cl. 235—79)

The invention relates to multiplication control means for calculating machines, and more particularly to control means of the same general character as disclosed in the copending application, Serial No. 711,253, of Edwin F. Britten, Jr. Moreover, in some of its broader aspects, the invention embodies operating principles in common with the disclosure of the British patent specification No. 156,715, published to Alexander Rechnitzer.

According to the aforenoted disclosures, the multiplication control means comprises a multiplier storage magazine having a series of elements successively settable to represent the successive digits of the multiplier. Each setting operation is followed by an indexing operation of the magazine, thereby moving the storage elements into position for the next setting operation; and the successively set storage elements are utilized in like sequence to control the duration of registration and carriage shift. The multiplying operation is initiated as an incident to the first indexing operation and the following setting and indexing operations may be performed concurrently with the registering and/or carriage shifting operations.

The present invention provides improved and simplified means for effecting the setting of the storage elements; for successively indexing said elements into setting position and for controlling the operation of the machine by the set storage elements. Furthermore, the improved setting and indexing means enables considerable reduction in the number of parts in a storage magazine of given capacity, thereby simplifying the structure and reducing its dimensions.

In the preferred form of the invention, as herein disclosed, reciprocally operable driving connections first set one of a series of digit slides, or alternatively one of an equal number of zero slides, and then index the storage magazine to position the next of the series of digit and zero slides into setting position. The driving connections are operated by an auxiliary clutch which is engaged for a single cycle of operation upon each depression of any one of a series of multiplier keys 0 to 9. The keys are depressed in accordance with the successive values of the multiplier digits and the first indexing operation is effective to initiate the multiplying operation, thereby permitting the subsequent setting and indexing operations to be effected concurrently with the calculation. A depressed multiplier key is effective to latch the other keys against depression and the depressed key is latched against retraction until the completion of the current setting and indexing operations. The operation, however, of the setting and indexing clutch is so rapid that the sequential depression of the succeeding multiplier keys may be effected as rapidly as is normally possible by the operator.

In the accompanying drawings illustrating the invention:

Fig. 2 is a left side elevation of the machine showing the registration control means, the stopping means therefor, and the setting and indexing clutch;

Fig. 3 is a vertical section through the machine showing the registering mechanism and the multiplier storage magazine;

Fig. 4 is a perspective view of the multiplier storage magazine and controls therefor;

Fig. 8 is a view taken on line 8—8 of Fig. 6 looking in the direction of the arrows;

Fig. 8a is a view similar to Fig. 8 with the parts in another position;

Fig. 9 is a view taken on line 9—9 of Fig. 6 with the parts in the position corresponding to the position of the parts shown in Fig. 8;

Fig. 9a is a view similar to Fig. 9 with the parts in the position corresponding to the position of the parts shown in Fig. 8a;

Fig. 10 is a detailed fragmentary perspective of parts shown in Fig. 4 and control mechanisms related therewith.

Registering operation

Figure 1:
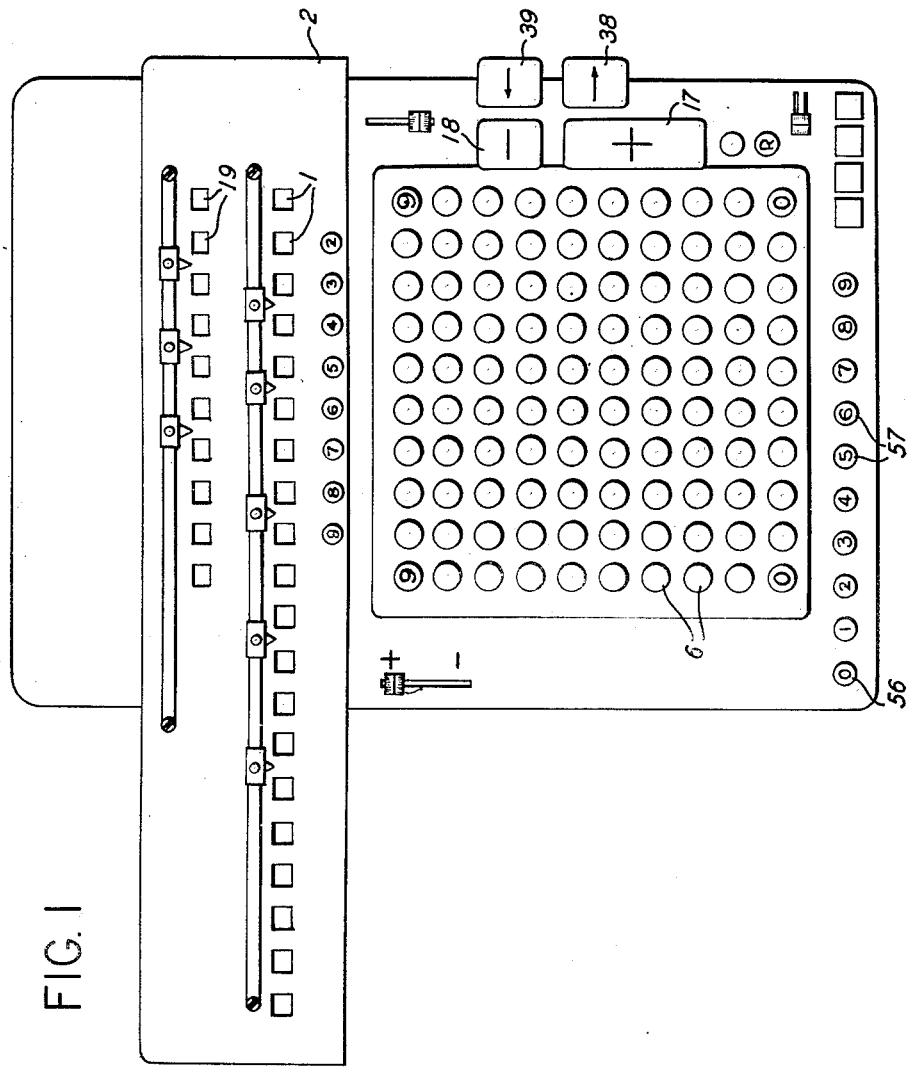
Fig. 1 is a plan view of a calculating machine embodying the invention.

The product dividend register comprising the numeral wheels 1 (Figs. 1 and 2) is mounted in the denominationally shiftable carriage 2. Registration is effected on wheels 1 by cyclically operable actuating mechanism comprising the differentially settable actuators 3 and the tens transfer actuators 4 (Figs. 2 and 3) which are mounted in the base of the machine. The differential actuators 3 are set by selector bails 5 in accordance with depressed settable numeral keys 6 of the keyboard, thereby determining the value registered in wheels 1 upon each cycle of operation of the actuating mechanism.

The differential actuators 3 and tens transfer actuators 4 are driven at a one to one ratio by a gear train 7 from the output gear 8 of the differential clutch mechanism 9 (Figs. 2 and 3). The differential clutch mechanism is constructed and transmits power from the motor 10 substantially in accordance with the disclosure of U. S. Patent No. 1,566,560, issued to George C. Chase on December 22, 1925. Normally the gearing comprising both working legs of the differential drive rotate idly as described in the aforenoted patent and no movement is transmitted to output gear 8. However, interruption of the movement of one of the legs will cause the planet gears to move in their orbit in one direction accordingly rotating output gear 8 and interruption of the movement of the other leg will cause movement in the other direction and reverse rotation of output gear 8.

The working legs of the differential drive are selectively arrested by means of a reversing clutch lever 11 (Figs. 2 and 2a) which is fulcrumed on the machine frame and settable to neutral, additive and subtractive positions. Clockwise movement of lever 11 will position it to additive setting whereby a hook arm 12 of said lever will engage a lug 13 on gear 14 forming one leg of the differential drive to interrupt its movement, thereby causing rotation of the output gear 8. Conversely, counterclockwise movement will position the lever 11 to subtractive setting whereby a hook arm 15 thereof will engage a stop 16 for the other leg of the differential to interrupt its movement and cause rotation of output gear 8 in the reverse direction. As hereinafter described, the multiplication control mechanism is selectively operable to move clutch lever 11 to one or the other of its active positions to initiate the registering operations of the calculation and is operable to initiate the operation of stopping means (to be described) for moving the clutch lever 11 to neutral position to conclude each of the successive registering operations. Also, depression of the plus and minus bars 17 and 18 (Fig. 1) are adapted to move clutch lever 11 to its additive and subtractive settings respectively and upon release the bars are effective to initiate operation of the stopping means. The controls, however, for these operations which are effected upon manipulation of the plus and minus bars are not shown as they form no part of the present disclosure nor do they have any operating relation therewith.

During each registering cycle of the actuators 3 and 4, a counting finger (not shown) will register a count in one of the numeral wheels 19 of the multiplier-quotient register (Fig. 1). This operation is an incident to the registration of the product in the product register under the control of the devices of the invention and the counting finger and the operating mechanism therefore may be of any well known design, such as that shown in U. S. Patent No. 2,273,237, issued to Edward C. Walter on February 17, 1942.

Full cycle stopping means

A rock arm 22 (Figs. 2 and 2a) is fixed at its lower end exteriorly of the left side frame, on a shaft 23. Shaft 23 extends across the machine and is journaled in the machine framing for rocking movement with arm 22. Arm 22 has link connection 20 with a crank 21 fixed on a shaft 25 which is driven by the actuator drive train 7 (Fig. 3) at a one to one ratio with actuators 3 and 4. Therefore, arm 22 will be rocked, from the full cycle position shown in Figs. 2 and 2a, forwardly and return during each operating cycle of the registering mechanism.

A stop arm 24 (Figs. 2 and 2a) is pivotally mounted on shaft 23 adjacent and inwardly of rock arm 22 and is normally biased toward the rear of the machine into engagement with a fixed pin 33 by a spring 24'. Mounted at the upper end of arm 24 is a spring urged pawl 27 which is held in inactive position by a trigger 28. Means hereinafter described in connection with the multiplication control mechanism are operable to raise trigger 28 to initiate operation of the stopping means, thereby terminating each of the successive registering operations of a program of multiplication.

When pawl 27 is released by trigger 28, its rearward free end will be moved downwardly and when the parts move through full cycle position, upon completion of the current operating cycle, released pawl 27 will drop in front of a shoulder 29 (Fig. 2a) of rock arm 22, thus connecting the drive to arm 24. Therefore, arm 24 will be rocked forwardly with arm 22 and into engagement with a fixed stop 30 to prevent further rotation of the parts.

In the movement of arm 24 against stop 30, one or the other of two opposed cam faces of an extension 31 of the arm will engage a pin 32 of a plate 34 which is pivotally mounted on the machine frame and has link connection 35 with clutch lever 11 to provide for movement of either of the connected members in accordance with the other. Clutch lever 11 will therefore be moved to neutral position with plate 34 upon engagement of pin 32 by the active cam face of extension 31. The parts will then rebound in the reverse direction to full cycle position where they will be arrested by a locator cam (not shown). The locator cam may be of any well known construction, such as disclosed in the aforenoted Patent No. 1,566,560, and may be fixed on any one of the shafts of the machine which have direct driving connection with the actuating mechanism. Furthermore, upon rebound of the parts from stop 30, pawl 27 will be reengaged by trigger 28 which will have been only momentarily raised in the stop initiating operation. Therefore, pawl 27 will be moved to its normal position out of engagement with shoulder 29.

Carriage shifting mechanism

The carriage shifting mechanism is constructed and operates substantially in accordance with the disclosure of U. S. Patent No. 1,964,478, issued to Austin A. Overbury on January 26, 1934, to which reference is made for the structural details of the mechanism and its operation.

Figure 7:
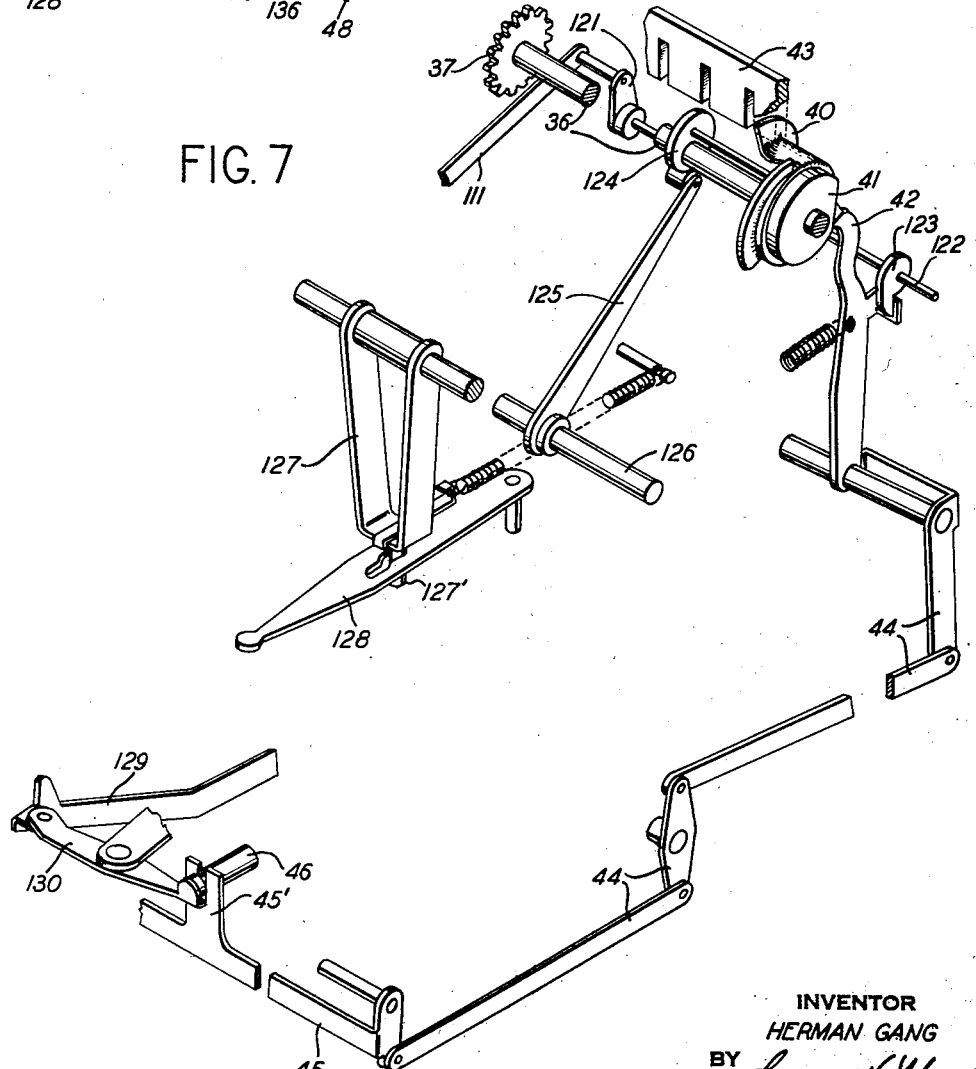
Fig. 7 is a fragmentary perspective of portions of the carriage shift mechanism and devices of the invention related therewith.

A pair of reversely threaded worms each provided with a clutch are supported on a shaft 36 (Figs. 2, 3, and 7) which is rotatably mounted in the side frames to the rear of carriage 2. The clutches of like construction are selectively engageable to connect the related worm to shaft 36 which is driven by gear train 37 (Fig. 2) from motor 10, thereby shifting carriage 2 to the right or left respectively. Right and left shift keys 38 and 39 (Fig. 1) are operable to control the engagement of the respective shift clutches. These controls, however, are not shown as they bear no relation to the present invention. Furthermore, only the left shift worm 40 (Figs. 3 and 7) and its clutch 41 are shown as the devices of the invention provide for leftward shift of the carriage in the performance of a program of multiplication. It will, however, be understood that the devices of the invention are equally applicable to control the shift in either direction.

The shift clutches are of well known construction wherein a spring urged pawl mounted on the driven member engages the driving member to connect the drive. A control detent 42 for the left shift clutch (Fig. 7) is normally spring urged into engagement with the pawl to disengage the clutch, and moved from engagement to permit the pawl to engage the clutch in a manner to be described in connection with the devices of the invention. Shift worm 40, upon rotation, will engage a notched rail 43 (Figs. 3 and 7) which is fixed to the rear of carriage 2, thereby shifting said carriage one decade toward the left upon each cycle of rotation. Upon release, control detent 42 will be spring urged into engagement with the periphery of clutch 41 and when the clutch completes its cycle of operation the detent will engage the clutch pawl to disconnect the drive, thereby terminating the shift.

As fully disclosed in the aforenoted Patent No. 1,964,478, means are provided to positively locate carriage 2 in its shifted position. Such means comprises a linkage 44 (Fig. 7) extending from clutch detent 42 to a bail 45 which extends across the front of the machine. A locating rod 46 (Figs. 2 and 7) is engaged at its forward end by an upstanding formed arm 45' of bail 45. Rod 46 extends toward the rear of the machine where its tapered free end normally engages one of the series of notches (not shown) in a rail 47 (Fig. 2) fixed across the front of carriage 2. Upon movement of detent 42 to engage shift clutch 41, bail 45 will be rocked by linkage 44 and move rod 46 from engagement with the related notch in rail 47, thereby releasing the carriage for the shifting operation. Upon movement of detent 42 to terminate the shift, the tapered end of rod 46 will be moved into engagement with a notch in rail 47, thereby definitely locating the carriage in its shifted position.

*Automatic multiplication (multiplier storage magazine)*

The product is registered in product-dividend wheels 1 (Figs. 1 and 2) by repeated addition of the multiplicand which is set in the differential actuators 3 by depression of keys 6 of the keyboard. Alternately, however, the machine may be adjusted for subtractive registration whereby negative multiplication will be performed.

A multiplier storage magazine generally designated by the reference numeral 48 (Figs. 3, 4, and 6) and devices operating in conjunction therewith control the program of multiplication, including the initiation of the operation, the registering and carriage shifting operations, and the terminating operation upon completion of the last registering and carriage shifting operations.

The multiplier storage magazine 48 is substantially spool shaped and is axially fixed on a shaft 49. Shaft 49 extends transversely of the machine below selector bails 5 (Fig. 3) and is journaled adjacent its ends for rotation in the machine framing. As shown, the capacity of the magazine allows for the storage of eight multiplier digits. The storage elements comprise eight differentially settable slides 50 and eight zero multiplier slides 51 (Figs. 3, 4, 6, 9, and 9a). The differentially settable and zero slides are mounted alternately in equidistantly spaced and radially extending slots which are axially aligned about the peripheries of magazine 48. The slides extend longitudinally from either end of the magazine and are radially contained by restraining rings 52 which encircle the slides at each end of the magazine.

Figure 6:
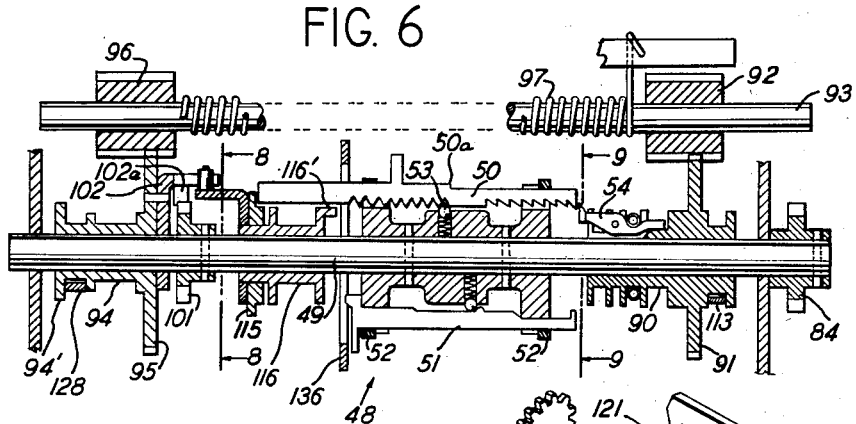
Fig. 6 is a longitudinal section through the multiplier storage magazine.

When in their normal positions (Figs. 4 and 6a, the differentially settable slides 50 represent the digit value of one. Therefore, in a setting operation (to be described) if the digit value is one, no adjustment of the related slide 50 will be effected. If, however, the value entered is a digit of two to nine, the related slide 50 will be adjusted accordingly one to eight steps toward the right from its normal position. If the multiplier digit value is a zero, the setting operation will be effective to move the related zero slide 51 a fixed distance toward the left from the normal position shown in Figs. 4 and 6. Spring urged balls 53 which are recessed in magazine 48 engage notches at the inner edges of slides 50, 51 to maintain them in adjusted position.

After each setting operation, the magazine will be indexed (in a manner to be described) one step in counterclockwise direction (Figs. 3 and 4), thereby moving another pair of slides 50, 51 into setting position. A counting pawl 54 (Figs. 6, 9, and 9a) is rotatably mounted with its active end in a plane a slight distance to the right of unset slides 50 and is normally spring urged to a home position (Fig. 9) where it is located midway between a slide 50 which is in setting position and the next slide 50 in the direction in which magazine 48 is indexed. During the initial indexing step of magazine 48, the slide 50 which was in setting position will be moved into operating relation (Fig. 9a) with pawl 54 which will then be moved with the slide as the magazine completes the indexing movement. As will be described, upon movement of pawl 54 from home position, the program of multiplication will be initiated. The subsequent setting and magazine indexing operations may be effected concurrently with the calculation. Counting pawl 54 is moved with magazine 48 upon subsequent indexing operations and concurrently operates to move the related slide 50 step by step back to normal position and one step beyond to the left, which movement of the slide terminates the registering operation and initiates a shift of carriage one decade toward the left to resume the calculation. Escapement means operated in conjunction with the carriage shift releases counting pawl 54 which is spring moved in the reverse direction one step of movement and thus into operating relation with the next slide 50. Upon movement of pawl 54 into a position in which a zero slide has been set, no registration will be effected, the carriage will be shifted, and the pawl released and moved reversely to its next position. The calculation will continue concurrently with the multiplier setting and magazine indexing operations until pawl 54 has been moved to its home position at which time the calculation will have been effected more rapidly than the setting and indexing operations or the product registration is completed. In either instance, the multiplying operation will be concluded but, however, will be resumed upon further multiplier setting and indexing operation. The foregoing briefly summarized operations in connection with the storage magazine and and other subsidiary operations are described in detail in the following.

*Automatic multiplication (control of the multiplier setting and magazine indexing clutch)*

A row of multiplier keys including a zero value key 56 and digit value keys 57 one to nine (Figs.

1, 4, and 5) are arranged in sequence from left to right across the machine in front of the keyboard. Depression of any one of the multiplier keys will engage a clutch 58 (Fig. 2) for a single cycle of operation. Clutch 58, upon each cycle of operation, will store the value of the depressed multiplier key in magazine 48 and index the magazine for another setting and indexing operation. In the embodiment of the invention as shown, carriage 2 is shifted toward the left in the performance of the program of multiplication. The multiplier keys 56, 57, indicating the values of the multiplier digits to be entered in the magazine are, therefore, depressed in sequence from the highest to the lowest order digit.

Figure 5:
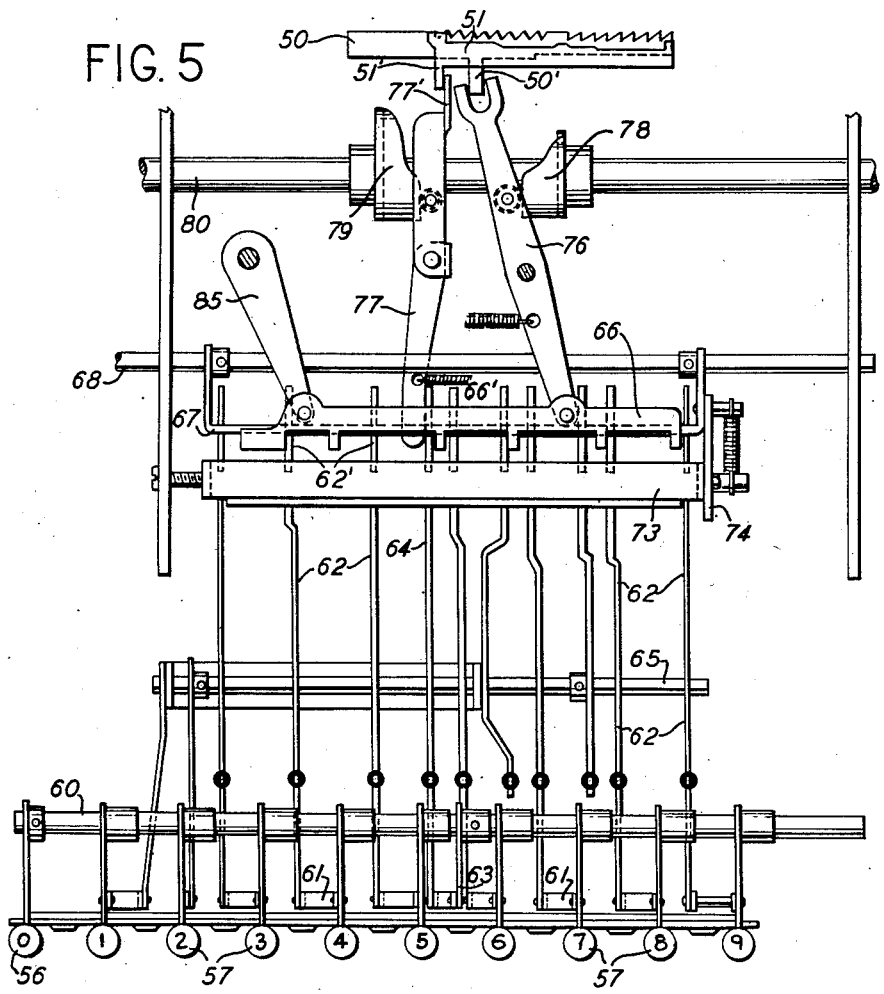
Fig. 5 is a plan view of the selection mechanism for the multiplier storage magazine.

Clutch 58 (Fig. 2) is of well known construction in which a spring urged pawl mounted on the driven member of the clutch is engaged by a detent 59 to disengage the clutch. The clutch is engaged by movement of the detent 59 to release the pawl which will then engage the driving member of the clutch, thereby connecting it with the driven member. Detent 59 is rocked clockwise (Fig. 2) to engage clutch 58 upon depression of the zero value key 56 or any one of the digit value keys 57 and, upon release of the depressed key, the detent will be urged against the periphery of the clutch to engage the clutch pawl upon completion of the cycle to disengage the clutch. Clutch 58 must be limited to one cycle of operation upon depression of each of the multiplier keys. The action, however, of clutch 58 is so rapid that the operator is usually unable to release the multiplier key before the clutch has completed its cycle. An auxiliary detent 59' is therefore spring urged into engagement with the periphery of clutch 58 upon movement of detent 59 to engage the clutch. The control of the operation of detents 59, 59' by multiplier keys 56, 57, is as follows:

The zero value key 56 and the one to nine value multiplier keys 57 have horizontally disposed stems (Figs. 2, 3, 4, and 5) which are mounted at their rearward ends on a shaft 60 extending across the machine and rotatably mounted in the side frames. The stems of keys 57 are freely mounted on shaft 60 and intermediate their ends the key stems have depending link connections 61 with the forward ends of digit selection levers 62. The stem of zero key 56 is fast on shaft 60 and a forwardly extending arm 63 fixed on said shaft has, at its forward end, depending link connection with the forward end of a zero selection lever 64 (Figs. 4 and 5). Selection levers 62, 64 are mounted on a shaft 65 which is journaled in the machine framing, and are arranged with relation to a selection comb 66 (to be described) in a manner to control the multiplier value entered in magazine 48 upon operation of clutch 58. Selection levers 62, 64 are not arranged in progressive sequence from left to right as are the multiplier keys. As shown, this is necessary to properly relate the selection levers to the comb 66 and appropriate crossover connections are provided to connect zero key 56 and digit value keys 57 by the depending links 61 to the related selection levers 64 and 62 respectively. It will be understood, however, that considerable latitude may be used in the design and arrangement of the parts without departing from the general operating principles. Upon depression of the zero key 56 or any one of the digit value keys 57, the connected selection lever 64 or one of the levers 62 respectively will be rocked in clockwise direction (Figs. 3 and 4), thereby raising the rear free end of the lever which movement operates to engage clutch 58 in the following manner.

The free rear ends of selection levers 62, 64 underlie the lower edge of a bail 67 (Figs. 3, 4, and 5) which extends transversely of the machine. Rearwardly extending arms of bail 67 are fixed on a shaft 68 which is rotatably mounted in the machine framing and extends outwardly from the left side frame (Fig. 2). Therefore, when a selection lever 62, 64 is rocked upon depression of a multiplier key, the free rear end of the lever will engage bail 67 and rock said bail and shaft 68 to which it is fixed in counterclockwise direction (Figs. 2, 3, and 4) against the tension of a spring 67' (Fig. 4) attached to the right end of the bail. Outwardly of the left side frame, a crank 69 (Fig. 2) with diametrically disposed arms is fixed at the end of shaft 68. The upper arm of crank 69 has link connection 70 with detent 59 of clutch 58 and the lower arm of the crank has yieldable link connection 71 with the auxiliary detent 59'. Crank 69, which will be rocked with shaft 68, will therefore move link 70 toward the rear of the machine and rock detent 59 clockwise to engage clutch 58. At the same time, crank 69 will move link 71 toward the front of the machine, thereby rocking detent 59' counterclockwise into engagement with the periphery of clutch 58 and tensioning a spring 71' which comprises the yieldable connection of the link with the detent. Therefore, if a multiplier key is held manually depressed, thus holding crank 69 in operated position until clutch 58 approaches full cycle position, detent 59' will be moved inwardly to a cut-away portion of the clutch housing and thereby engage the clutch pawl to disengage the clutch. Upon release of the depressed multiplier key, the connected one of the digit value selection levers 62 or the zero selection lever 64 will be moved to normal by a return spring 72 (Figs. 3 and 4) with which each lever is provided and the key will therefore be raised to normal by the connecting linkage. Bail 67 will now be allowed movement to normal by spring 67' (Fig. 4) and thus crank 69 will be rocked clockwise to the normal position shown in Fig. 2. Accordingly, link 70 will move detent 59 to clutch disengaging position and link 71 will move detent 59' to clutch engaging position. Clutch 58, however, will remain disengaged as a slight step of movement of the clutch will bring its pawl into contact with detent 59.

Upon depression of the zero key 56 or one of the digit value keys 57, provision must be made to prevent the depression of another of the multiplier keys until clutch 58 has completed its cycle of operation. This is necessary as the storage of only one multiplier digit in magazine 48 may be effected upon each cycle of operation of the clutch and furthermore, the operation of the selection mechanism would be disorganized. Therefore, latching means prevents the retraction of a depressed multiplier key, if manually released, until clutch 58 completes its cycle of operation; and the latched down key, in turn, operates a series of latch plates 72 (Fig. 4) to prevent the depression of any other of the multiplier keys.

Latching plates 72 are pivotally mounted at their lower ends and the upper horizontal edges of the plates are disposed just below the stems of multiplier keys 56, 57. The upper edges of plates 72 extend adjacent one another leaving a slight gap between the plates below the multiplier key stems. The spacing of plates 72 is such that upon depression of a multiplier key, its stem will pass between two of the plates, thereby moving the plates and closing the gaps between all other of the plates; thus latching any other of the multiplier keys against depression.

A depressed multiplier key 56, 57 will be restrained against retraction until clutch 58 has completed its cycle of operation by a latching bail 73 (Figs. 3, 4, and 5). Latching bail 73 has pivotal mounting in the machine framing and at its right end (Figs. 4 and 5) the bail has pin and slot connection with a link 74 which is attached at its rear end to bail 67. Bail 73 extends above and across the digit value selection levers 62, 64 inwardly of their free ends and is adapted to engage the latching shoulders 75 with which each of the selection levers is provided. When bail 67 is rocked by a selection lever 62, 64, the pin and slot connection in link 74 will permit the shoulder 75 of the lever to be raised above the rear edge of bail 73. However, as bail 67 completes its movement, link 74 will be effective to rock bail 73 in counterclockwise direction (Figs. 3 and 4) thereby moving the rear edge of the bail beneath shoulder 75, thus holding the selection lever rocked and the multiplier key depressed. Bail 67 will be prevented from movement to normal until clutch 58 (Fig. 2) has completed its cycle by the action of detent 59. Detent 59, after movement to engage clutch 58 will, if released, move only a slight distance and then will be restrained by engagement with the periphery of clutch 58 until the clutch approaches full cycle position. Therefore, crank 69, shaft 68, and bail 67 will be held in rocked position and the depressed multiplier key latched against retraction until detent 59 moves inwardly to disengage clutch 58 at the end of its cycle.

*Automatic multiplication (setting and indexing operations)*

Means reciprocally driven by clutch 58 controls the operation of setting means to enter a value in magazine 48 in accordance with a depressed multiplier key and to then index the magazine into position for another setting and indexing operation.

It will be recalled that no adjustment of a differentially settable slide 50 (Figs. 4, 5, and 6) is required for storage of the digit value one in magazine 48. Therefore a spring urged lever 76 is operable to adjust a slide 50 which is in setting position, one to eight steps of movement toward the right representative of the digit values two to nine. A second spring urged lever 77 is operable to adjust a slide 51 which is in setting position a predetermined distance toward the left for the storage of a zero multiplier. Levers 76 and 77 are restrained in normal position (Figs. 4 and 5) by cam arms 78 and 79 engaging respectively a roller of the levers.

Cam arms 78, 79 are fixed on a shaft 80 which is journaled in the machine framing and extends outwardly (Fig. 2) from the left side frame. An upstanding crank 81 (Fig. 2) is fixed at the left end of shaft 80 and has link connection 82 with the driven housing of clutch 58. Therefore, upon each cycle of operation of clutch 58, crank 81, shaft 80, and cam arms 78, 79 will be rocked in clockwise direction (Figs. 2, 3, and 4) and return. The setting operation will be performed upon movement of cam arms 78, 79 to release levers 76 and 77 and upon the return movement of shaft 80 and the arms 78, 79 the magazine indexing operation will be performed.

As best seen in Figs. 4 and 5, lever 76 has a forked rear end engaging a lug 50' of a differentially settable slide 50 which is in setting position. Magazine 48 is definitely located in the last position to which it was indexed by a holding pawl 83 (Fig. 4) engaging a tooth on a ratchet 84 which is fixed on supporting shaft 49 of the magazine. As hereinafter described, magazine 48 is indexed counterclockwise (Figs. 3 and 4) and is never restored but remains in the last position to which it is indexed. Zero lever 77 has a finger 77' (Figs. 3 and 5) at its rear end a slight distance to the right of a lug 51' of a zero slide 51 adjacent the slide 50 which is engaged by lever 76. The setting and indexing operations will first be described in connection with differentially settable slides 50 upon depression of multiplier keys 57 which represent the digits one to nine.

Upon depression of a multiplier key 57, an upstanding lug 62' (Figs. 3, 4, and 5) of the rocked selection lever 62 will be raised into operating relation with a tooth 66' of selection comb 66. Comb 66 is mounted in a horizontal plane at the forward end of lever 76 and at the forward end of an arm 85 which is pivotally mounted at its rear in spaced relation to lever 76. Therefore, lever 76 which is spring urged in clockwise direction (Figs. 4 and 5) will, if released, move comb 66 toward the left. Upon operation of clutch 58 and the consequent rocking of cam arm 78, lever 76 will be rocked clockwise a distance determined by the engagement of a tooth 66' of comb 66 with the lug 62' of a lever 62 which is rocked upon depression of a multiplier key 57. The arrangement is such that if the key 57 representing the digit value of one is depressed the lug 62' of the rocked lever 62 will be raised into a position a very slight distance to the left and into the path of movement of one of the teeth 66' of comb 66. Therefore, when lever 76 is released by cam arm 78, no appreciable movement will be afforded said lever as comb 66 will be restrained from movement toward the left by engagement of the tooth 66' with lug 62' and the related storage slide 50 will remain in normal unadjusted position which is representative of the digit one.

If, however, a key 57 representative of the digits two to nine is depressed, the lug 62' of the rocked lever 62 will be moved into a position to the left of a tooth 66' of comb 66 a distance which will permit released lever 76 to be moved by its spring one to eight steps of movement. The forked end of lever 76 will therefore be effective to move the engaged slide 50 one to eight steps of movement to the right (Figs. 4, 5, and 6) representative of the digits two to nine. It will be noted that the lever 62 which is rocked by the nine key 57 is without a restraining lug 62', and in setting of the digit nine, the slide 50 will be adjusted the maximum distance of eight steps which adjustment is controlled by engagement of a shoulder 50a on the slide 50 engaging the retaining ring 52 (Fig. 6) at the right end of magazine 48. During the setting of one of the digits one to nine, the zero setting lever 77 will be released by cam arm 79 but will be restrained from movement by the forward free end of said lever in engagement with the rear end of the unrocked zero selection lever 64 (Figs. 4 and 5).

An indexing pawl 86 (Fig. 4) is mounted on an arm 87 which is pivotally mounted on shaft 49 to the right of ratchet wheel 84. Pawl 86 engages a tooth of ratchet 84 and arm 87 has link connection 88 with an upstanding crank 89 which is fixed on rock shaft 80. When shaft 80 is rocked clockwise by the setting operation of clutch 58, pawl 86 will be rocked in the same direction by the connecting linkage and thus moved one tooth space on stationary ratchet 84. Therefore, when shaft 80 is rocked counterclockwise to normal by clutch 58, pawl 86 will be effective to index ratchet 84, shaft 49, and magazine 48 one step of movement in a counterclockwise direction.

During the first part of the indexing step of magazine 48, the lug 50' of the set slide 50 will be moved from engagement with the fork end of setting lever 76 and lug 51' of the adjacent zero slide 51 will be moved from its position for engagement by the finger 77' of zero setting lever 77. Cam arm 78, in its return movement, will then engage lever 76 and move said lever to normal position (Figs. 4 and 5) just prior to the completion of the indexing of magazine 48. As magazine 48 completes its movement, the lug 50' of the next slide 50 in the series will be moved within the forked end of setting lever 76 and the lug 51' of the next zero slide 51 in the series will be moved into position to be engaged by the finger 77' of zero lever 77. Thus, the next pair of the series of storage slides 51, 51 will be moved into setting position.

*Automatic multiplication (initiation of the program)*

As an incident to the first indexing step of magazine 48, the set digit slide 50 will be moved from the position shown in Fig. 9 into operating relation with the counting pawl 54 as shown in Fig. 9a, and certain adjustments of the machine will be effected and the multiplying program will be initiated as follows:

Pawl 54 is mounted in a longitudinal slot in a sleeve 90 (Figs. 4 and 6) which is rotatably and slidably mounted on shaft 49 to the right of magazine 48. A gear 91 is integral with sleeve 90 and meshes with a spur gear 92 which is fixed on a shaft 93 journalled in the machine framing in parallel relation with magazine 48. To the left of magazine 48 and also rotatably and slidably mounted on shaft 49 is a second sleeve 94 having a gear 95 integral therewith. Gear 95 meshes with a spur gear 96 which is fixed on shaft 93. The spur gears 92, 96 are of such a width that the gears 91, 95 respectively are allowed considerable longitudinal movement on shaft 49 and still maintain mesh with the respective spur gears. A torsion spring 97 (Figs. 4 and 6) has one end attached to shaft 93 and the other end to the machine framing. Torsion spring 97 thus urges shaft 93 and spur gears 92, 96 mounted thereon in counterclockwise direction (Fig. 4). Spur gears 92, 96 therefore urge gears 91, 95 and counting pawl 54, which are in fixed rotational relationship, in a clockwise direction on shaft 49.

When the machine is in a normal position of rest, gears 91, 95 and pawl 54 are urged to a home position by spring 97 and are so located and restrained from further clockwise movement by a pin 98 (Figs. 8 and 10) on the outer face of gear 95 engaging the forked end of an arm 99 of a bail 100. When in this position, counting pawl 54 is located midway between the slide 50 which is in setting position and the next slide 50 as viewed in a clockwise direction (Fig. 9) and the active end of the pawl is located in a vertical plane a slight distance to the right of the right end of unset slides 50 (Fig. 6). Pawl 54, therefore, will be out of the longitudinal path of movement of the slide 50 which is in setting position and will not interfere with the setting movement of the slide.

Magazine 48 will be independently moved during approximately the first half of the initial indexing operation and this half step of movement will bring the set slide 50 into longitudinal alignment with counting pawl 54 which is at this time in home position. However, upon further movement of the magazine, pawl 54 will be moved therewith, thus maintaining the set slide 50 and said pawl in operating relationship as shown in Fig. 9a. When pawl 54 is moved from home position, the parts entrained therewith will be moved accordingly and this movement effects the aforenoted adjustments of the machine and initiates the multiplying operation. The devices effecting the above operations are constructed and operate as follows:

An escapement wheel 101 (Figs. 4, 6, 8, and 8a) is fixed on shaft 49 to the right of gear 95. Fixed on the inner face of gear 95 adjacent wheel 101 is an escapement pallet 102 which is therefore in fixed rotary relation to counting pawl 54. Pallet 102 comprises arms 102a and 102b. When the parts are in normal position, arm 102a is positioned in the path of movement and midway between two of the teeth of escapement wheel 101 and arm 102b is positioned to the right and out of the path of movement of the escapement wheel. Therefore, midway in the step of movement of the initial indexing operation of magazine 48, a tooth of wheel 101 will engage arm 102a of pallet 102, thereby moving gear 95, spur gears 96, 92, gear 91, and counting pawl 54 with magazine 48 during the remainder of the initial indexing movement. Upon subsequent indexing movements, wheel 101, through pallet arm 102a, will be effective to move counting pawl 54 a full step of movement with magazine 48 unless said pawl has been returned reversely to home position, as later described, in which instance the above operations will be repeated upon depression of a multiplier key.

Upon movement of gear 95 and the consequent movement of pin 98 from engagement with the forked end of arm 99 of bail 100, said bail will be operated to move clutch lever 11 (Figs. 2 and 2a) and initiate a registering operation of the multiplying program. Bail 100 extends to the outside of the left side frame and is thereat provided with an upstanding arm 100a, having a forked free end which embraces a pin 11a (Figs. 2a and 10) on clutch lever 11. The prongs of the forked arm 100a are so spaced that normally clutch lever 11 may be moved in other registering operations to its active positions without interference. Bail 100 extends further to the outside of the machine and at its end has another upstanding arm 100b. Arm 100b has toggle spring connection 103 (Fig. 2) with a two position lever 104. When lever 104 is in the counterclockwise position shown in Fig. 2, toggle spring 103 biases bail 100 in counterclockwise direction. Normally, bail 100 is held in central inactive position by pin 98 engaging the fork 99 of the bail. However, when pin 98 is removed from fork 99 during the last half of the initial indexing operation, toggle spring 103 will be effective to rock bail in counterclockwise direction (Figs. 2 and 10) and fork arm 100a will engage pin 11a, thereby rocking clutch lever 11 clockwise and effecting additive operation of the registering mechanism. If lever 104 is set clockwise from the position shown in Fig. 2, toggle spring 103 will bias bail 109 in the reverse direction, thereby providing for negative registration upon release of the bail by pin 93.

Carriage shift control mechanism will be conditioned upon movement of gear 95 from home position and the resulting initiation of the multiplying operation. At the left end and integral with sleeve 94 and gear 95 is a flange 94' (Fig. 4) having a cam depression in its periphery. When the parts are in normal position (Fig. 4) a roller on one arm of a spring urged bell crank 105 engages the cam depression of flange 94'. The other arm of bell crank 105 has link connection 106 with one arm of a bell crank 107 (Fig. 2) which has pivotal mounting on the inner face of the left side frame. An upstanding crank 108 at the outside of the left side frame is connected for movement with bell crank 107 by a common pivotal mounting on which both of the cranks are fixed. Crank 108 has link connection 109 with the upstanding arm of a bell crank 110, the other arm of which has slot and pin connection with the forward end of shift control link 111. Therefore, upon movement of flange 94' with gear 95 from home position, crank 105 will be rocked clockwise (Fig. 4) by action of the cam depression in the flange and through the connecting linkage, the forward end of shift link 111 (Fig. 2) will be lowered, thus moving a shoulder at the under forward end of the link into position in front of a pin 112 on stop arm 24. This adjustment constitutes the conditioning of the shift control mechanism.

*Automatic multiplication (registering and carriage shifting operations)*

The duration of the individual successive registering operations constituting the program will be controlled by pawl 54 (Figs. 6, 9, and 9a) operating with successively set slides 50 in like succession, and each of the individual registering operations will be followed by a carriage shift of one decade toward the left until the last registering operation, which is followed by a carriage shift, is effected. As heretofore noted, after the multiplying program is initiated, the successive multiplier digit setting and magazine indexing operations will be effected concurrently with the calculation unless the machine runs ahead of the operator, in which case the machine will come to rest and then be restarted upon depression of another multiplier key.

The differentially settable slides 50 (Figs. 4 and 6) each have on their inner edges eight tooth spaces representative of the digits two to nine and equidistantly spaced from the right ends of the slides. As heretofore noted, if a digit value of one is stored in magazine 48, no adjustment is made on the controlling slide 50. Therefore, when the slide is moved into alignment with counting pawl 54, the left active end of the pawl will be positioned a slight distance from the right end of the slide, as shown in Fig. 6. If the stored digit is two, pawl 54 will engage the first tooth space from the end of slide 50, etc. Upon each registering cycle of the machine, pawl 54 will be longitudinally reciprocated toward the left from the position shown in Fig. 6 a distance of one tooth space of slides 50 and return. Therefore, a set slide 50 engaged by pawl 54 will be moved one step to the left toward its normal position upon each registering cycle of the machine and when restored to its normal position, pawl 54 upon the following registering cycle will engage the end of the slide and move said slide to the left one step beyond its normal position. The movement of a slide 50 the step beyond its normal position is adapted to terminate the registration at the end of the current registering cycle. Therefore, if the digit multiplier is one, pawl 54 will engage the end of the aligned slide 50 during the first registering cycle, thereby terminating the registration, and if the pawl engages the first tooth space of the slide, it will engage the end of the slide during the second registering cycle, etc. The devices for driving the pawl 54 and for terminating the registrations are as follows:

Sleeve 90 (Figs. 4 and 6) on which pawl 54 and gear 91 are mounted has an annular groove to the right of the gear. An arm 113 (Fig. 4) is pivotally mounted for reciprocation in a horizontal plane and the rear end of the arm engages the annular groove of sleeve 90. Shaft 23, to which rock arm 22 is fixed (Fig. 2), extends across the machine above arm 113 and a depending arm 114 (Fig. 4) fixed on shaft 23 carries a drive pin which engages a cam slot 113a in arm 113. As arm 22 is rocked upon each registering cycle of the machine, shaft 23 will rock arm 114 and the pin thereon will reciprocate the rear end of arm 113 to the left (Figs. 4 and 6) and return. Sleeve 90 will therefore be reciprocated by arm 113 and pawl 54 mounted on the sleeve will feed the aligned slide step by step toward the left and one step beyond to stop the registration. It will be noted that gear 91 mounted on sleeve 90 will be moved longitudinally with the sleeve, but will remain in mesh with spur gear 92. Therefore, subsequent multiplier setting and magazine indexing operations may be effected concurrently with the registration as pawl 54 may be rotated with magazine 48 at the same time it is longitudinally reciprocated. When the slide 50 aligned with pawl 54 is stepped back one step past its normal position, the registration will be terminated as follows:

When slides 50 are in normal position (Figs. 4 and 6) their left ends are in abutment with the right face of a plate 115. Plate 115 is mounted on a sleeve 116 (Figs. 6 and 10) which is rotatably and slidably mounted on shaft 49. As hereinafter described, sleeve 116 also has operating relation with zero slides 51. Suitable flanges on sleeve 116 longitudinally contain plate 115 so that the sleeve and plate move longitudinally as a unit on shaft 49. However, plate 115 is restrained from rotational movement by an integral arm extending therefrom and fixed at its end on a shaft 117 (Figs. 4 and 10). Shaft 117 extends across the machine and is slidably mounted in the machine framing (not shown). A compression spring on shaft 117 engages a collar on the shaft and the machine framing thereby urging shaft 117, plate 115, and sleeve 116 to their normal position toward the right which position is determined by a fixed stop (not shown).

Figure 2A:
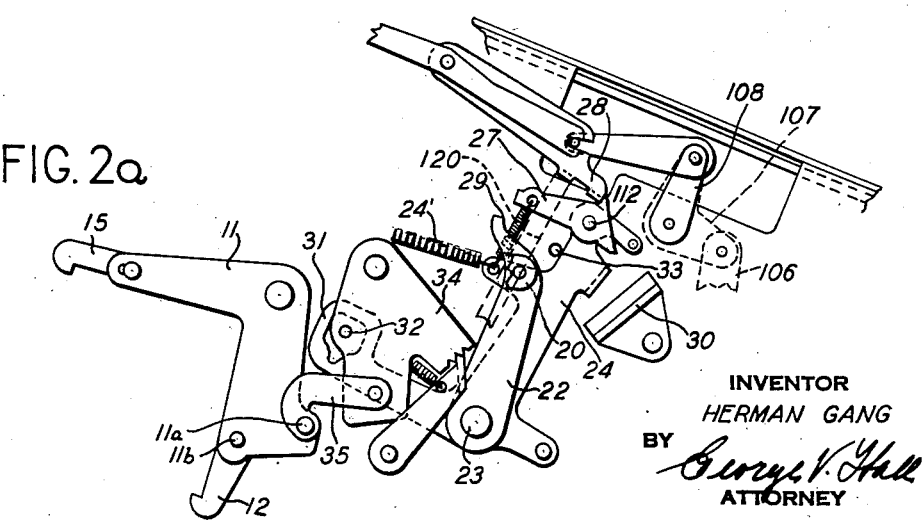
Fig. 2a is a detail elevation of certain parts shown in Fig. 2.

The left end of shaft 117 (Fig. 4) engages an inclined lug at the end of the right arm of a lever 119 which is pivotally mounted inwardly of the left side frame. The lower end of a push rod 120 is pivotally attached at the end of the left arm of lever 119 and extends upwardly in suitable guides at the inner side of the left side frame. As shown in Figs. 2 and 2a, a lug on the under edge of trigger 28 extends inwardly through an opening in the left side frame and the upper free end of push rod 120 (shown in dotted lines) underlies the lug. Therefore, upon movement of a slide 50 to the left beyond its normal position, the end of the slide engaging plate 115 will move said plate and shaft 117 to the left and the left end of lug of lever 119 will rock said lever clockwise (Fig. 4). Push rod 120 will therefore be raised by lever 119 and trigger 28 will be raised by the upper end of the push rod, thereby releasing pawl 27 and terminating the registration as described in connection with the registering mechanism. In its return reciprocatory movement, counting pawl 54 will release the aligned slide 59 and spring 118 will restore shaft 117, plate 115 and slide 50 to its normal position. Trigger 28 will also be released and upon the rebound of stop arm 24 from stop 30, pawl 27 will be reengaged by the trigger.

The operation of the registration terminating means will initiate a one decade carried shift, the carriage shifting operation will operate escapement 101, 102 (Figs. 4, 6, 8, 8a, and 10), thereby releasing counting pawl 54 for one step of reverse movement into alignment with the next digit slide 59 which has been set and upon termination of the carriage shifting operation, clutch lever 11 will be again moved to active position to start the registering operation in the next order as follows:

Upon movement of arm 24 (Figs. 2 and 2a) against stop 30, pin 112 on said arm will engage the shoulder at the end of shift link 111, thereby moving said link toward the front of the machine. Link 111 is attached at its rear end to crank 121 (Figs. 2 and 7) which is fast on a rotatably mounted shaft 122. A trigger 123 (Fig. 7) fixed on shaft 122 engages a lug of left shift clutch detent 42. Therefore, crank 121, shaft 122 and trigger 123 will be rocked by link 111, thus moving detent 42 and engaging shift clutch 41. Clutch 41 will be engaged for a single cycle of operation as arm 24 (Fig. 2) rebounding from stop 30 will release link 111, thus permitting the spring of detent 42 to urge it to clutch disengaging position.

Escapement 101, 102 will be operated by a cam 124 (Figs. 3 and 7) on shift shaft 36. Cam 124 is engaged by a roller at the rear end of a spring urged arm 125. Arm 125 is fixed at its forward end to a transverse shaft 126 which is journalled in the machine framing. A depending yoke 127 is fixed on shaft 126 and, at its lower end, the yoke has a drive pin 127′ engaging a cam slot in a horizontally disposed arm 128. Arm 128 is pivotally mounted at its rear and at its forward end (Figs. 4 and 6) engages a spool formed on sleeve 94. Therefore, when shift clutch 41 is operated, cam 124 will depress arm 125 (Fig. 7) and then allow it to be spring restored to normal. Shaft 126 and yoke 127 will be rocked by arm 125 and arm 128 will move sleeve 94, gear 95, and escapement pallet 102 to the left and return.

In the leftward movement of the parts, pallet arm 102a (Fig. 8a) will be moved from engagement with the tooth of escapement wheel 101 and pallet arm 102b will be moved into position midway between two of the teeth of the wheel. Therefore, gear 95, on which pallet 102 is fixed, will be released and driven in clockwise direction (Fig. 4); counterclockwise (Fig. 8a) by spring 97 through gear 96 on shaft 93. Gear 91 will be driven in like direction by gear 92 and also sleeve 90 and counting pawl 54. Thus, arm pallet 102b will be moved into engagement with a tooth of escapement wheel 101, thereby preventing further reverse movement of the parts until pallet 102 is moved back to the right with gear 95. The above described operation provides for approximately one half step of movement of the parts.

Upon movement of pallet back to the right, arm 102b will be moved from engagement with wheel 101 and arm 102a will be moved into position to engage the next tooth of wheel 101. Therefore, the parts will be released a second time and the full reverse step of movement will be afforded the parts, thereby moving counting pawl 54 into alignment with the next digit slide 59. It will be noted that the multiplier storing and magazine indexing operations may be effected concurrently with the reverse movement of counting pawl 54 as the relative reverse movement of the parts will not be effected by the indexing movement to move the parts as a unit in the opposite direction.

Means must be provided to prevent the reinitiation of registration until the carriage shifting operation is completed. Such means comprises a lever 135 (Fig. 2) pivotally mounted on the left side frame. Lever 135 has an open end slot at the under side of its left rear end above a pin 11b of clutch lever 11. The right arm of lever 135 has link connection 129 with the left arm of a lever 130 (Fig. 7) which has fixed pivotal mounting at the front of the machine. The right free end of lever 130 has a lug engaged by the forward end of carriage locator rod 46. Upon initiation of the carriage shift, locator rod 46 is moved toward the front of the machine and lever 130 will be rocked clockwise (Fig. 7) and link 129 will be moved toward the rear of the machine, thereby rocking lever 135 counterclockwise (Fig. 2). At this time, clutch lever 11 will have been centralized against the bias of toggle spring 103 by the cam slot of extension 31 of stop arm 24. The slot at the rear of lever 135 will therefore engage pin 11b of clutch 11, thereby holding it in neutral position when it is released by extension 31 as arm 24 rebounds from stop 30. At the conclusion of the carriage shifting operation, carriage locator rod 46 will be moved toward the rear, thereby releasing lever 130 and link 129 will be spring moved toward the front of the machine, thus rocking lever 135 and releasing clutch lever 11. Toggle spring 103 (Fig. 2) will then be effective to rock clutch 11 to active position, thereby starting a registering operation which will be controlled by counting pawl 54 which, during the carriage shift, was moved reversely into alignment with the next digit slide 59. The alternate registering and carriage shifting operations will be effected until counting pawl 54 has been stepped reversely into alignment with the last digit slide which has been set. The carriage shift operation following the final registering operation will release counting pawl 54 which now, however, will be afforded only a half step of movement because pin 98 (Figs. 8 and 10) on gear 95 will engage forked arm 99, thereby preventing further reverse movement of the connected parts. Bail 100, therefore, will be constrained from rocking movement by pin 98 and thus, upon termination of the carriage shift, toggle spring 103 (Fig. 2) will be ineffective to move clutch lever 11 from neutral position.

*Automatic multiplication control by zero multiplier slides*

Depression of zero multiplier key 56 provides for one decade of carriage shift without registration. Upon depression of zero key 56, zero selection lever 64 (Figs. 4 and 5) will be rocked and the setting and indexing clutch 58 will be engaged as heretofore described. When zero selection lever 64 is rocked, its rear end will be raised from engagement with the forward arm of zero setting lever 77, thereby releasing said lever. At the same time, the rear end of zero selection lever 64 will be raised into position a very slight distance to the left of a tooth 66' of selection comb 66, thus preventing digit setting lever 76 from movement to set the related slide 50. Released zero setting lever 77, upon operation of clutch 58, will therefore engage lug 51' and move the related zero slide 51 toward the left (Figs. 4 and 6) until checked from further movement by a lug at its right end.

A fixed ring 136 (Figs. 3, 4, 6, and 10) is axially and concentrically located to the left of magazine 48 and radially to the outside of digit slides 50, the left ends of which extend therethrough. As seen in Figs. 3 and 4, ring 136 is cut away at a point aligned with a zero slide 51 when the slide is in setting position. When a zero slide 51 is moved to the left in the setting operation, lug 51' of the slide will be passed through the opening in ring 136, thus bringing said lug to the outer left side of the ring. In the subsequent indexing operation of magazine 48, the set slide 51 will be moved counterclockwise (Fig. 4) within the ring and the radially extending lug 51' to the left of the ring will prevent said slide from return movement toward the right.

A set zero slide 51 operates in connection with the aforenoted sleeve 116 (Figs. 4, 6, and 10) to initiate operation of the carriage shifting mechanism. Sleeve 116 has a flange at its left end and the flange has pin and slot driving connection 131 with escapement pallet 102. As heretofore described, pallet 102 has fixed rotary relation through gearing 95, 96, 92, 91, and sleeve 90 with counting pawl 54 (Fig. 6). Therefore, sleeve 116, having slot and pin connection 131 with pallet 102, is also rotationally driven in fixed relation with pawl 54. The flanged right end of sleeve 116 has a rightwardly extending lug 116' and when counting pawl 54 is in home position (Figs. 4 and 9), lug 116' is in longitudinal alignment to the left of the zero slide 51 which is in setting position. Therefore, if there are no other multiplier values stored in magazine 48 and a zero slide 51 is set, the left end of the slide will engage lug 116', thereby moving sleeve 116, plate 115, and shaft 117 to the left to release detent 27. As heretofore described, the subsequent initial indexing operation of magazine 48 will result in the movement of clutch lever 11 to active position. However, no registration will be effected as released detent 27 will carry arm 24 against stop 30, thereby initiating a carriage shift and neutralizing clutch lever 11.

If one or more multiplier values have been stored in magazine 48, counting pawl 54 will be aligned with one of the digit slides 50, as described, and lug 116' will have been moved from its position in alignment with a zero slide 51 to a position between two of the zero slides. If now a zero slide 51 is set, it will not engage lug 116' nor be moved far enough to engage sleeve 116 and thus a multiplier value of zero will be stored in the magazine. The subsequent indexing operation will move set zero slide 51 into position to be restrained from right return movement by ring 136 as heretofore described. It will be noted that each of the zero slides 51 is in advance of the related digit slide 50 in the direction of the indexing movement. Therefore, when pawl 54 and sleeve 116 are released by escapement 101, 102, for the reverse step of movement, lug 116', about midway in its step of movement will engage a zero slide 51 if it is set before pawl 54 is moved into alignment with the related digit slide 50. It will be seen that as lug 116' engages and passes reversely beyond a set slide 51, sleeve 116 will be moved to the left, thus releasing detent 27, and therefore the operation of pawl 54 will be superseded by lug 116'. Therefore, upon completion of the carriage shift which operates escapement 101, 102 and the reengagement of clutch lever 11, stop arm 24 will be carried against stop 30 and another carriage shift will be effected. Any set zero slide 51 will remain in set position until, upon subsequent indexing operation, it is moved into setting position. Upon movement into setting position, the lug 51' of a set slide 51 will be engaged by a cam segment 132 (Figs. 3 and 4) which has fixed mounting with relation to ring 136, and the slide will be cammed to the right through the opening in ring 136 to its normal position.

Usually the program of multiplication will be effected so rapidly that the multiplier storage capacity of magazine 48 will not be reached. However, should this condition be reached, means are provided to prevent an indexing operation following the setting operation which exhausts the capacity. Such means comprises a crank 137 (Fig. 10) having an open end slot 137'. If one or the other of the next zero and digit slides 50, 51 which will be indexed into setting position has been set, pin 98 on gear 95 which rotates with counting pawl 54 and lug 116' will have entered slot 137', thereby rocking crank 137 clockwise (Fig. 10). Crank 137 has yieldable link connection 133 with a bail 134. Bail 134 extends outwardly from the left side frame and, at its left end, the bail has a detent 134' (Fig. 2) which is normally out of engagement with the periphery of setting and indexing clutch 58. However, when crank 137 is rocked by pin 98, link 133 through bail 134 will yieldably urge detent 134' against the periphery of clutch 58. Therefore, when clutch 58 performs the setting operation which exhausts the capacity of magazine 48, said clutch will be arrested in mid cycle position. When the slide 50 or 51 to be moved to setting position is available, pin 98 will have been moved reversely with gear 95, pawl 54, and lug 116', thereby releasing crank 137 and restoring detent 134' to normal, thus reengaging clutch 58 which will in completing its cycle of operation effect the indexing operation.

Although a preferred form of the invention has been shown and described as embodied in a particular type of calculating machine, it will be understood that the devices of the invention may be employed to control the operation of other types of calculating machines. Also, it will be apparent that the devices of the invention may be subject to considerable alteration without departing from the improved operating principles set forth. The invention, therefore, is not to be considered restricted to the specific embodiment disclosed except as required by the spirit of the appended claims.

I claim:

1. In a motor driven calculating machine having a product register, differential actuators therefor, cyclic drive means for said actuators, means for initiating operation of said drive means, and full cycle stopping means for said drive means; means for controlling multi-cyclic operation of the differential actuators, including digit multiplier keys, motor driven means operable upon manipulation of any one of said keys, a series of differentially settable elements, a drive transmission engageable with and operable in response to the operation of said motor driven means to effect a setting of an adjacently positioned element, value selection means operable by said key manipulation to control the operation of said drive transmission, movable mounting means for said elements positioned to locate one of said elements in setting position, driving connections for indexing said mounting means by said motor driven means to successively bring said settable elements into setting position, a contact member engageable by said elements to operate the stopping means, a feed device initially positioned in operative association with the first of said elements which is set, and movable with and adjustable relative to the mounting means, reciprocable driving means for said feed device and operable in time with the differential actuators to feed said associated element step by step toward the stop operating contact member during movement of said mounting means, and devices operable in response to the operation of the stopping means to move the feed device reversely relative to the mounting means into association with successively set elements.

2. A motor driven calculating machine according to claim 1 provided with a shiftable carriage having the product register mounted therein and carriage shifting means for said carriage, and wherein the devices operable in response to the operation of the stopping means to move the feed device reversely relative to the mounting means include said carriage shifting means.

3. In a motor driven calculating machine having a product register, differential actuators therefor, cyclic drive means for said actuators, means for initiating operation of said drive means, and full cycle stopping means for said drive means; means for controlling multi-cyclic operation of the differential actuators, including digit multiplier keys, motor driven means operable upon manipulation of any one of said keys, a series of differentially settable elements, setting means operable in response to the operation of said motor driven means to effect a setting of an adjacently positioned element, value selection means operable by said key manipulation to control the operation of said setting means, adjustable mounting means for said settable elements positioned to locate one of said elements in setting position, driving connections for indexing said mounting means by said motor driven means to successively bring said settable elements into setting position, a feed device for said settable elements and movable with and relative to the mounting means, reciprocable driving means for said feed device and operable in time with the differential actuators to feed an element step by step back from its set position during movement of said mounting means and devices operable in response to the feed back movement of said element to a predetermined position to operate said stopping means and to move said feed device reversely relative to the mounting means into relation with another set element.

4. In a motor driven calculating machine having a product register, differential actuators therefor, cyclic drive means for said actuators, means for initiating operation of said drive means, and full cycle stopping means for said drive means; means for controlling multi-cycle operation of the differential actuators, including multiplier keys, a rotary magazine, unitary power means operable upon manipulation of any one of said keys, differentially settable slides mounted in said magazine, setting means positioned adjacent one of said slides and operable in response to the operation of said power means to set said slide, value selection means operable by said key manipulation to control the operation of said setting means, driving connections for rotating said magazine by said power means to successively bring said slides into setting position, a feed device for said slides and rotatable with said magazine, reciprocal driving means for said feed device and operable in time with the differential actuators to feed a slide step by step back from its set position during rotation of said device, and devices operable in response to the feed back movement of said slide to a predetermined position to operate said stopping means and to rotate said feed device reversely relative to the magazine into relation with another set slide.

5. In a motor driven calculating machine having a product register, differential actuators therefor, cyclic drive means for said actuators, means for initiating operation of said drive means, and full cycle stopping means for said drive means; means for controlling multi-cyclic operation of the differential actuators, including multiplier keys, a rotary magazine, unitary power means operable upon manipulation of any one of said keys, differentially settable slides mounted in said magazine, setting means positioned adjacent one of said slides and operable in response to the operation of said power means to set said slide, value selection means operable by said key manipulation to control the operation of said setting means, driving connections for rotating said magazine by said power means to successively bring said slides into setting position, a feed device for said slides and rotatable with said magazine, spring means having a driving train connected with said feed device for energizing said means upon rotation of said device, reciprocal driving means for said feed device operable in time with the differential actuators to feed a slide step by step back from its set position during rotation of said feed device, and devices operable in response to the feed-back movement of said slide to a predetermined position to operate said stopping means and to release said spring means and thereby rotate said feed device reversely relative to the magazine into relation with another set slide.

6. In a motor driven calculating machine having a product register, differential actuators therefor, cyclic drive means for said actuators, means for initiating operation of said drive means, and full cycle stopping means for said drive means; means for controlling multi-cycle operation of said actuators, comprising multiplier keys, a rotary magazine including a series of differentially settable slides, a clutch engageable for a single cycle of operation upon depression of any one of said keys, cam means operable by said clutch, a setting lever positioned adjacent one of said slides and operable in response to the operation of said cam means to set said slide, selection means operable by said key depression to control the operation of said setting lever in accordance with the indicated value of the depressed key, a driving train for rotating said magazine by said clutch subsequent to the setting operation to thereby position another of said slides adjacent said setting lever, a feed device for said slides rotatable with said magazine, driving means for said feed device operable in time with the differential actuators to feed a slide step by step back from its set position during rotation of said feed device, spring means having a driving train connected with said feed device for energizing said means upon rotation of said device, and devices operable in response to the feedback movement of said slide to a predetermined position to operate said stopping means, and an escapement operable in response to the operation of said stopping means to release said spring means and thereby rotate said feed device reversely relative to the magazine into relation with another set slide.

7. In a motor driven calculating machine having a product register, differential actuators therefor, cyclic drive means for said actuators, means for initiating operation of said drive means, and full cycle stopping means for said drive means; means for controlling multi-cycle operation of said actuators, comprising multiplier keys, a rotary magazine including a series of differentially settable slides, a clutch engageable for a single cycle of operation upon depression of any one of said keys, a setting lever positioned adjacent one of said slides, spring means for operating said lever to set said slide, selection means associated with said keys to control the operation of said setting lever in accordance with the indicated value of a manipulated key, a cam arm normally engaging and holding said setting lever in ineffective position against the tension of its spring, a pawl and ratchet drive for indexing said magazine, including a holding pawl, a common drive means reciprocally operated by said clutch for moving said cam arm to permit the setting operation of said spring operated setting lever and to subsequently restore said lever and index said magazine to thereby position another of said slides adjacent said lever, a feed device rotatable with said magazine, driving means for said feed device operable in time with the differential actuators to feed a slide step by step back from its set position during rotation of said feed device, spring means having a driving train connected with said feed device for energizing said spring means upon rotation of said device, devices operable in response to the feed back movement of said slide to a predetermined position to operate said stopping means, and an escapement operable in response to the operation of said stopping means to release said spring means and thereby rotate said feed device reversely relative to the magazine into relation with another set slide.

8. In a motor driven calculating machine having a product register, differential actuators therefor, cyclic drive means for said actuators, means for initiating operation of said drive means, and full cycle stopping means for said drive means; means for controlling multi-cycle operation of said actuators, comprising multiplier keys, a rotary magazine including differentially settable slides mounted in and equidistantly spaced about the periphery thereof in an endless series, a clutch including connections operable upon depression of any one of said keys to effect the engagement thereof for a single cycle of operation, setting means positioned adjacent one of said slides and operable to set said slide, selection means for controlling operation of said setting means upon depression of said keys, indexing means operable to rotate said magazine step by step, thereby bringing said slides successively into setting position, common drive means reciprocably operable by said clutch to cause the operations of said setting and indexing means seriatim, a clutch control detent movable to control the disengagement and reengagement of said clutch in mid cycle position, thereby delaying operation of said indexing means, connections engageable to effect the disengaging movement of said detent, spring means for effecting the reengaging movement of said detent, a feed device for said slides and rotatable with said magazine, means rotatable with said feed device for engaging said detent connections upon rotation of said device to a given position, reciprocal driving means for said feed device and operable in time with the differential actuators to feed a slide step by step back from its set position during rotation of said feed device, devices operable in response to the feed back movement of said slide to a predetermined position to operate said stopping means, and means operable in response to operation of the stopping means to rotate said feed device reversely relative to said magazine into relation with another set slide and thereby disengage said detent connections to permit the clutch reengaging movement of said detent by its spring.

9. In a motor driven calculating machine having a product register, cyclic differential actuators therefor, cyclic drive means for said actuators including a control member movable to drive initiating and terminating positions and full cycle stopping means for said drive means operable to move said control member to drive terminating position; multiplier keys, unitary power means operable upon manipulation of any one of said keys, a series of differentially settable elements, adjustable mounting means for said settable elements, setting means positioned adjacent one of said elements and operable in response to the operation of said power means to effect a setting of said element, selection means operable to control operation of said setting means upon manipulation of said keys, driving connections for moving said mounting means by said power means to successively bring said settable elements into setting position, a feed device for said settable elements and movable with said mounting means from a home position; normally disabled devices operable in response to the movement of said feed device from home position to move said drive control member to drive initiating position, a contact member engageable by said settable elements to operate said stopping means, reciprocable driving means for said feed device and operable in time with the differential actuators to feed an element step by step toward said stop operating contact member during movement of said mounting means, and devices operable in response to the operation of said stopping means to move said feed device reversely relative to said mounting means toward its home position into relation with another set element and to restrain said drive control member from drive initiating movement during such reverse feed device movement.

10. A motor driven calculating machine according to claim 9 wherein the devices operable in response to the movement of the feed device from home position to move the drive control member to drive initiating position comprises spring biased mechanism provided with latching means for normally holding said spring mechanism in ineffective position and means operable upon movement of said feed device from home position to release said latching means.

11. A motor driven calculating machine according to claim 9 wherein the cyclic actuator drive means is reversely operable, the drive control member is alternatively movable to initiate the drive in either direction and the devices operable to move said drive control member are selectively adjustable to cause the operation thereof to effect the alternative movement, including a settable member for so adjusting said devices.

12. In a motor driven calculating machine having a shiftable carriage, a product register mounted therein, cyclic differential actuators for said register, carriage shifting means, cyclic drive means for said actuators including a control member movable to drive initiating and terminating positions and full cycle stopping means for said drive means operable to move said control member to drive terminating position; multiplier keys, unitary power means operable upon manipulation of any one of said keys, a series of differentially settable elements, adjustable mounting means for said elements, setting means positioned adjacent one of said elements and operable in response to the operation of said power means to effect a setting of said element, selection means for controlling operation of said setting means upon manipulation of said keys, driving connections for moving said mounting means by said power means to successively bring said settable elements into setting position, a feed device for said settable elements and movable with said mounting means from a home position, normally disabled devices operable in response to the movement of said feed device from home position to move said drive control member to drive initiating position, a contact member engageable by said settable elements to operate said stopping means, reciprocable driving means for said feed device and operable in time with the differential actuators to feed an element step by step toward said stop operating contact member during movement of said mounting means, connections movable upon operation of said stopping means to initiate operation of said carriage shifting means, and devices operable by said carriage shifting means to move said feed device reversely relative to said mounting means toward its home position into relation with another set element and to restrain said drive control member from drive initiating movement during the shifting operation.

13. A motor driven calculating machine according to claim 12 wherein the devices operable in response to the movement of the feed device from home position to move the drive control member to drive initiating position comprises spring biased mechanism provided with latching means for normally holding said spring mechanism in ineffective position and means operable upon movement of said feed device from home position to release said latching means and wherein the drive control member restraining device comprises a normally ineffective latch movable by the carriage shifting means for restraining said drive control member from movement by said spring mechanism.

14. In a motor driven calculating machine having a shiftable carriage, a product register mounted in said carriage, differential actuators for said register, cyclic drive means for said actuators, means for initiating operation of said drive means, carriage shifting means and full cycle stopping means for said drive means; multiplication control means, including multiplier keys and a zero key, a rotary magazine, unitary power means operable upon depression of any one of said keys, differentially settable storage slides mounted in said magazine, zero slides mounted in said magazine, setting means for said storage slides and setting means for said zero slides alternatively operable in response to the operation of said power means and controlled by said keys to set an adjacently positioned storage or zero slide, a driving train for rotating said magazine by said power means to successively bring said slides into setting position, a contact member engageable by said storage slides to operate the stopping means, a feed device for said storage slides and rotatable with said magazine, a member connected for rotation with said feed device and engageable by said zero slides to initiate operation of said carriage shifting means, reciprocable driving means operable in time with the differential actuators to feed a storage slide step by step toward said stop operating contact member, means operable in response to the operation of said stopping means for initiating operation of said carriage shifting means, means operable in response to the operation of said carriage shifting means to rotate said feed device and the connected member reversely relative to the magazine into operative relationship or engagement respectively with a set storage or zero slide.

15. A motor driven calculating machine according to claim 14 wherein the feed device and connected shift initiating member are initially located in a home position and said shift initiating member is thereat engageable by a zero slide upon movement to set position.

16. A motor driven calculating machine according to claim 14 provided with retaining means operable to maintain a zero slide in set position upon movement of said slide from setting position and camming means for normalizing said slide upon movement into setting position.

17. In a motor driven calculating machine having a product register, differential actuators therefor, cyclic drive means for said actuators, means for initiating operation of said drive means, and full cycle stopping means for said actuators; means for controlling multi-cycle operation of the differential actuators, including multiplier keys, a rotary magazine including differentially settable slides mounted in and about the periphery thereof in an endless series, setting means positioned adjacent one of said slides and controlled by said keys to set said slide, indexing means operable to rotate said magazine step by step, thereby bringing said slides successively into setting position, a clutch engageable for a single cycle of operation upon depression of any one of said keys for operating said setting and indexing means successively, a detent movable to disengage and reengage said clutch in mid-cycle position, thereby delaying the operation of said indexing means, a contact member engageable by said slides to operate said stopping means, a feed device for said slides and rotatable with said magazine, means responding to rotation of the feed device with the magazine to move said detent to clutch disengaging position when the storage capacity of the magazine is exhausted, reciprocal driving means for said feed device and operable in time with the differential actuators to feed a slide step by step toward the stop operation contact member during rotation of said feed device, devices operable in response to the operation of the stopping means to rotate the feed device reversely relative to the magazine into relation with successively set slides and means responding to the reverse movement of said feed device to move said detent to clutch reengaging position.

18. The invention according to claim 17 provided with latching means including connecting means controlled by the clutch in mid-cycle position to lock a depressed one of the multiplier keys in depressed position and all other of said keys from depression.

19. In a motor driven calculating machine having an ordinally shiftable carriage, a product register mounted in said carriage, differential actuators for said register, cyclic drive means for said actuators, carriage shifting means and full cycle stopping means for said drive means; multiplication control means, including multiplier keys and a zero key depressible to initiate operation of said drive means, a rotary magazine, unitary power means operable upon depression of any one of said keys, differentially settable storage slides mounted in said magazine, zero slides mounted in said magazine, a setting lever positioned adjacent to and engageable with a storage slide including spring means for operating said lever under control of said multiplier keys to set said slide, another setting lever positioned adjacent to and engageable with a zero slide including spring means for operating said lever under control of said zero key to set said slide, an adjustable blocking member normally positioned to prevent operation of said zero slide setting lever and movable upon depression of said zero key from said normal position into position to prevent the operation of said storage slide setting lever, a reciprocally operable cam arm for each of said setting levers normally positioned for holding the associated lever in ineffective position against the tension of its spring, indexing means for said magazine, common drive means reciprocally operable by said unitary power means for simultaneously moving said cam arms from holding position to permit the operation of one or the other of said setting levers by its spring and to subsequently restore said operated lever and to operate said indexing means to thereby position another of said storage and zero slides in setting position, a contact member engageable by said storage slides to initiate operation of the stopping means, a feed device for said storage slides and rotatable with said magazine, a member connected for rotation with said feed device and engageable by said zero slides to initiate a single ordinal shift operation of said carriage shifting means, reciprocable driving means for said feed device operable in time with the differential actuators to feed a storage slide step by step toward said stop operating contact member, means operable in response to the operation of said stopping means for initiating a single ordinal shift operation of said carriage shifting means, means operable in response to the operation of said carriage shifting means to rotate said feed device and the connected member reversely relative to the magazine into operative relationship or engagement respectively with a set storage or zero slide, and means operable in response to the termination of said carriage shift operation to reinitiate operation of said actuator drive means.

20. In a motor driven calculating machine having an ordinally shiftable carriage, a product register mounted therein, carriage shifting means, differential actuators for said register, cyclic drive means for said actuators, and full cycle stopping means for said drive means; multiplication control means, including a series of differentially settable elements, a drive transmission engageable with and operable to set an adjacently positioned element, movable mounting means for said elements positioned to locate one of said elements in setting position, indexing devices operable to move said mounting means thereby bringing said elements successively into setting position, motor driven means for operating said transmission and indexing devices, digit multiplier keys each depressible to initiate operation of said motor driven means, value selection means for controlling operation of said drive transmission upon depression of said multiplier keys, means responsive to depression of said keys to initiate operation of said actuator drive means, a contact member engageable by said elements to operate said stopping means, a feed device initially positioned in operative association with the first of said elements which is set and movable with and adjustable relative to said mounting means, drive means for said feed device reciprocably driven in time with said actuators and thereby operable to feed said associated element step by step toward said stop operating contact member during movement of said mounting means, devices operable in response to operation of said stopping means to initiate a single ordinal shift operation of said shifting means and to adjust said feed device reversely relative to said mounting means into association with another set element, and means operable upon termination of said shifting operation to reinitiate operation of said actuator drive means.

21. The invention according to claim 20 wherein the devices operable in response to operation of said stopping means to adjust said feed device relative to the mounting means includes spring operated mechanism having a drive train operable by said motor driven means for energizing said mechanism.

22. In a motor driven calculating machine having an ordinally shiftable carriage, a product register mounted therein, carriage shifting means, differential actuators for said register, cyclic drive means for said actuators, and full cycle stopping means for said drive means; multiplication control means, including a series of differentially settable slides, a drive transmission engageable with and operable to set an adjacently positioned slide, a rotary magazine having said slides mounted therein and positioned to locate one of said slides in setting position, indexing devices operable to effect stepwise rotation of said magazine thereby bringing said slides successively into setting position, motor driven means for operating said transmission and indexing devices, digit multiplier keys each depressible to initiate operation of said motor driven means, value selection means for controlling operation of said drive transmission upon depression of said multiplier keys, means responsive to depression of said keys to initiate operation of said actuator drive means, a contact member engageable by said slides to operate said stopping means, a feed device initially positioned in operative association with the first of said slides which is set and rotatable with and relatively to said magazine, drive means for said feed device reciprocally driven in time with said actuators and thereby operable to feed said associated slide step by step toward said stop operating contact member during rotation of said magazine, devices operable in response to operation of said stopping means to initiate a single ordinal shift operation of said shifting means and to rotate said feed device reversely relative to said magazine into association with another set slide, and means operable upon termination of said shifting operation to re-initiate operation of said actuator driving means.

23. In a motor driven calculating machine having a product register, differential actuators therefor, cyclic drive means for said actuators, means for initiating operation of said drive means, and full cycle stopping means for said drive means; means for controlling multi-cycle operation of said differential actuators, including digit multiplier keys, a rotary magazine, differentially settable slides mounted in said magazine, a drive transmission operable to set said slides, value selection means for controlling operation of said transmission upon depression of said keys, devices operable to effect stepwise rotation of said magazine to bring successive unset slides into setting position, motor driven means operable upon depression of said keys to operate said drive transmission and indexing devices seriatim, a contact member engageable by said slides to operate the stopping means, devices rotatable with the magazine including a feeding pawl for said slides, reciprocable driving means for said pawl operable in time with the differential actuators to feed a slide step by step toward said stop operating contact member during rotation of said devices, and devices operable in response to operation of the stopping means to rotate the feed devices reversely relative to the magazine into relation with successively set slides.

HERMAN GANG.

REFERENCES CITED

The following references are of record in the file of this patent:

UNITED STATES PATENTS

| Number | Name | Date |
| --- | --- | --- |
| 2,538,896 | Britten, Jr. | Jan. 23, 1951 |

FOREIGN PATENTS

| Number | Country | Date |
| --- | --- | --- |
| 156,715 | Great Britain | Jan. 7, 1921 |